UNITED STATES PATENT OFFICE.

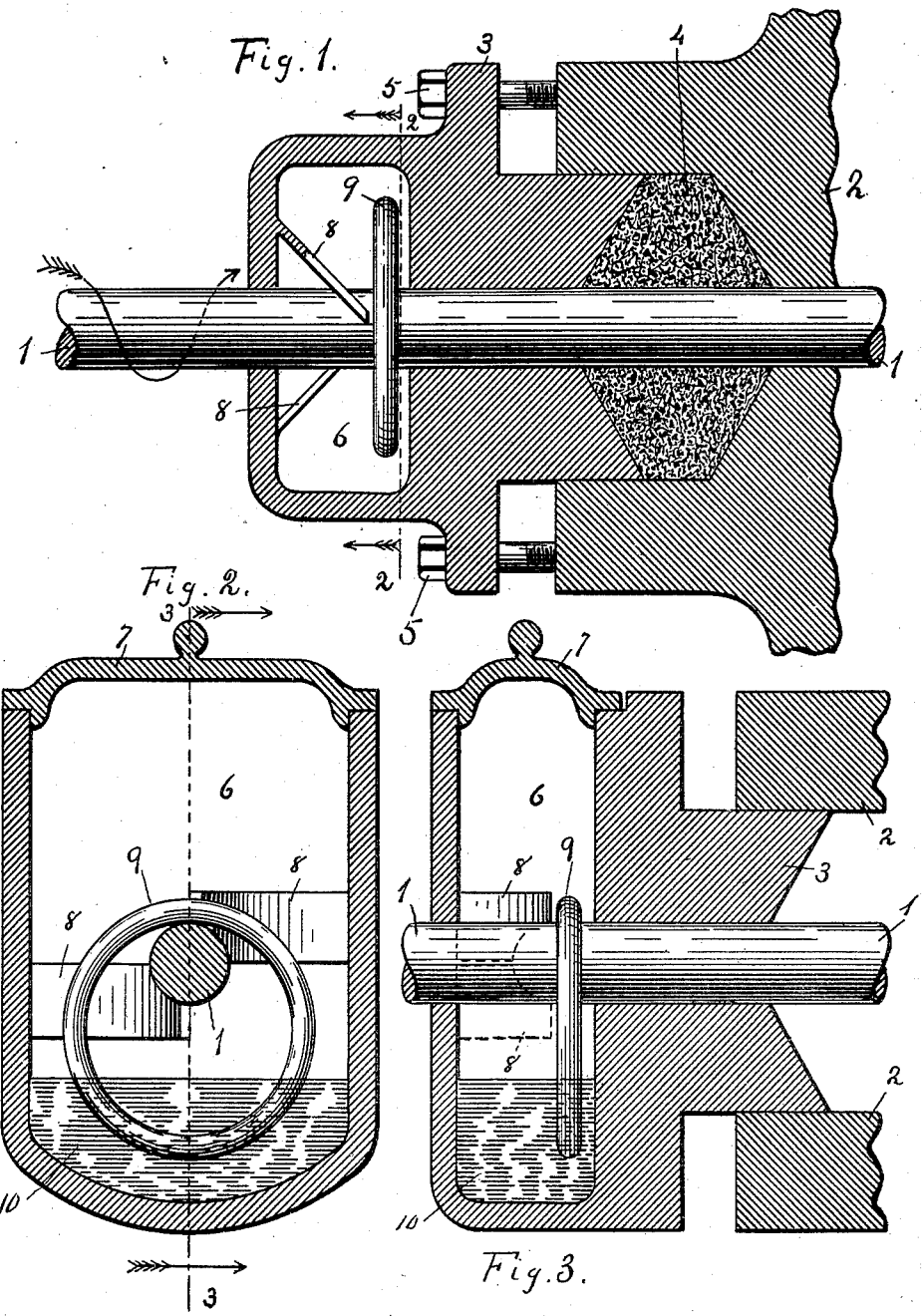

FERDINAND W. KROGH, OF SAN FRANCISCO, CALIFORNIA.

AIR-SEAL.

994,937.

Specification of Letters Patent. Patented June 13, 1911.

Application filed August 5, 1909. Serial No. 511,466.

*To all whom it may concern:*

Be it known that I, FERDINAND W. KROGH, of San Francisco, California, have invented certain new and useful Improvements in Air-Seals, whereof the following is a specification.

My invention is intended more particularly for use with centrifugal pumps. In these pumps it is necessary to apply stuffing boxes to the shafts, ordinarily, for the reason that the suction is at the center, and any leakage of air at this point is to be avoided, as it would materially affect the performance of the pump, and might even break the priming, in the case of high lifts. For this reason it has been customary, not only to apply stuffing boxes to the shafts, but also to screw up the glands thereof very tight to prevent such leakage, and this has necessitated copious lubrication to overcome the friction engendered thereby.

It is the object of my present invention to seal up any orifices through which leakage could take place, by filling them with liquid, such as oil, which being automatically supplied to the shaft, is drawn into the orifices by the suction of the pump. By using oil for this purpose, I at the same time automatically lubricate the shaft.

In carrying out my invention I surround the shaft by an oil, or other liquid, chamber, immediately adjacent to the gland, where a stuffing box is used, and in this chamber I place means for delivering the oil to the shaft near the desired point, and also means for directing the oil toward the desired point.

In the accompanying drawings, consisting of one sheet I have shown my invention as applied to the stuffing box of a centrifugal pump.

In the drawings:—Figure 1 is a longitudinal section, showing part of a stuffing box with its gland, and the oil chamber formed as a part of the gland, with the supplying means and the directing means in place, in elevation, the shaft being also shown in elevation. Fig. 2 is a cross section, taken at the line 2, 2, of Fig. 1, looking in the direction of the arrows. Fig. 3 is a longitudinal section, taken on the line 3, 3, of Fig. 2, looking in the direction of the arrows, and is a similar view to that of Fig. 1, but at right angles thereto, and shows the gland and a portion of the stuffing box.

*Summary.*—Briefly set out, 1 is the shaft of the pump. See Figs. 1, 2 and 3. 2 is the stuffing box thereon. See Fig. 1. 3 is the gland applied thereto. See Figs 1, 2 and 3.

4 is the packing in the stuffing box. See Fig. 1.

5 are the bolts for holding the gland. See Figs. 1 and 2.

6 is the oil chamber. See Figs. 1, 2 and 3.

7 is the cover to the oil chamber. See Figs. 2 and 3.

8 is the directing wings. See Figs. 1, 2 and 3.

9 is the ring for supplying oil to the shaft. See Figs. 1, 2 and 3.

10 is the oil in the chamber 6. See Figs. 2 and 3.

*Detailed description.*—I will now describe the mechanism of the apparatus set forth in the above figures of the drawings, premising with the statement that where I use the word oil, whether in the specification or the claims, I do not necessarily mean the lubricant commonly called by that name, only, but include other lubricants and liquids which would perform the functions herein ascribed to and performed by the oil.

In these figures:—1 represents the shaft of a centrifugal pump by which the impeller of the pump is rotated. Such pumps are shown in my applications Serial Nos. 289,486 and 290,619 and in my Patent No. 805,019, and need not be further herein described.

2 is the stuffing box on the shaft, 3 is the gland applied thereto, by which the packing 4 is compressed about the shaft, by means of the bolts 5. Upon the gland, and, if desired, cast integral therewith and surrounding the shaft I place a chamber 6, which may be provided with a cover 7, applied to an open side thereof. The chamber is adapted to contain oil for lubricating the shaft where it passes through the gland and stuffing box. Upon one side of the chamber 6, preferably that opposite the head of the gland, are interior helical wings 8, which embrace the shaft in close proximity thereto. The function of these wings is to direct oil upon the shaft toward the gland and prevent it working out of the chamber at the side opposite the gland.

9 represents a ring loosely strung upon shaft 1 and of a size to hang down into the oil 10 contained therein. As the shaft revolves this ring rotates with it and carries oil up onto the shaft, which oil is drawn into the stuffing box by the suction of the impeller of the pump. The oil thus carried up and delivered to the shaft by the ring, is prevented from working away from the gland by the directing wings 8, whose angle is such that oil thrown against them by the rotation of the shaft is directed toward the gland.

The oil chamber being integral with the gland performs the additional function of maintaining the alinement of the latter and prevents any inequality in the screwing of the bolts from causing the gland to bind on the shaft.

I have hereinabove illustrated my invention in its simplest form, and have not thought it necessary to show any modifications of it, though such will be easily made and applied by the mechanic without further instructions than are herein contained.

Having thus described my invention, and believing that I have made a valuable improvement in the art to which it pertains, I claim:

1. In a centrifugal pump, a shaft provided with a stuffing box and a gland applied thereto, in combination with an oil chamber formed in said gland and wings in said chamber for directing the oil to the shaft.

2. In combination with the shaft of a centrifugal pump, and the stuffing box and gland applied thereto, an oil chamber adjacent to the shaft, means on said shaft for delivering oil thereon from said chamber, and means in said chamber for directing said oil toward the gland.

3. In combination with the shaft of a centrifugal pump, and the stuffing box and gland applied thereto, an oil chamber surrounding the shaft immediately adjacent to the gland, wings in the chamber contiguous to the shaft and adapted to direct the oil toward the gland, and a loose ring upon the shaft between said wings and the gland.

4. In combination with the shaft of a centrifugal pump, and the stuffing box and gland applied thereto, an oil chamber surrounding the shaft and formed integral with the gland, wings integral with said chamber on the inside thereof and contiguous to the shaft and adapted to direct the oil toward the gland, and a loose ring upon the shaft between said wings and the gland.

5. In combination with the shaft of a centrifugal pump and the stuffing box, a gland applied thereto, provided with helical means for lubricating the shaft and maintaining its alinement.

6. In combination with the shaft of a centrifugal pump, and the stuffing box and gland applied thereto, an oil chamber surrounding the shaft immediately adjacent to the gland and in line therewith, and means on said shaft for feeding the oil thereon from said chamber, and means for directing said oil toward the gland.

7. In combination with the shaft of a centrifugal pump, and the stuffing box and gland applied thereto, an oil chamber surrounding the shaft in line with the gland, and means within the chamber for feeding the oil therein to the shaft, and means for directing such oil toward the gland.

8. In combination with the shaft of a centrifugal pump and the stuffing box and gland applied thereto, an oil chamber surrounding the shaft adjacent to the gland, movable means on said shaft for delivering oil thereon from said chamber, and stationary means within said chamber to direct said oil from said shaft toward the gland.

In testimony that I claim the foregoing I have hereto set my hand at said San Francisco this 26th day of May, 1909.

FERDINAND W. KROGH.

In presence of—
ALFRED FUHRMAN,
W. S. BATES.

---

Copies of this patent may be obtained for five cents each, by addressing the "Commissioner of Patents, Washington, D. C."